T. E. MURRAY, Jr., AND J. B. MURRAY.
METHOD OF ELECTRICAL WELDING.
APPLICATION FILED MAY 21, 1919.
1,316,384.
Patented Sept. 16, 1919.
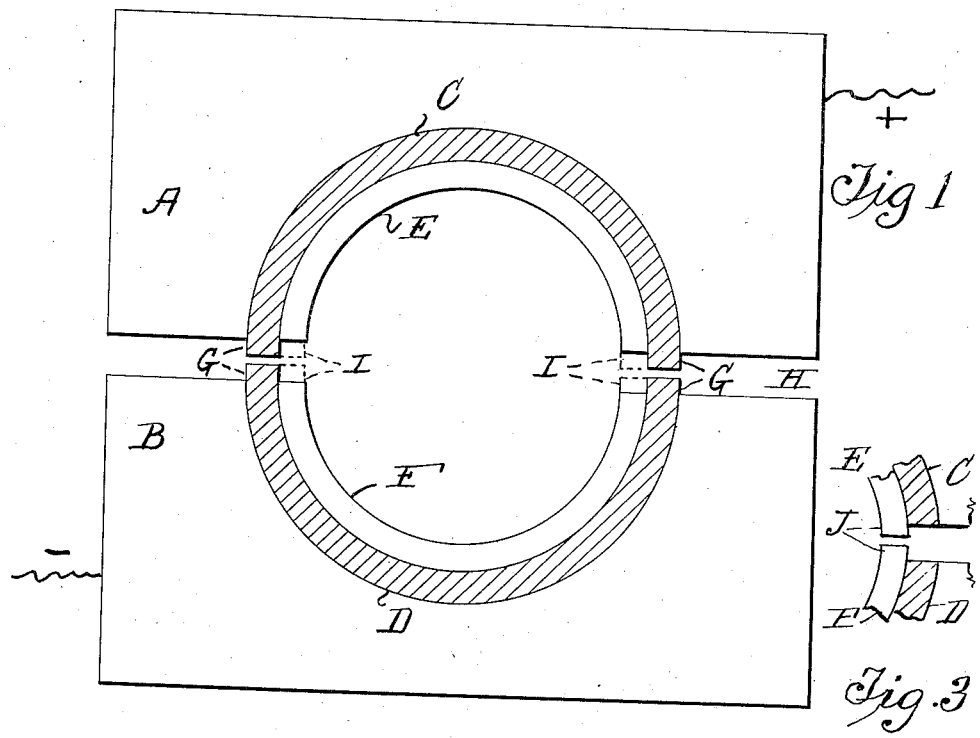
Fig. 1
Fig. 3
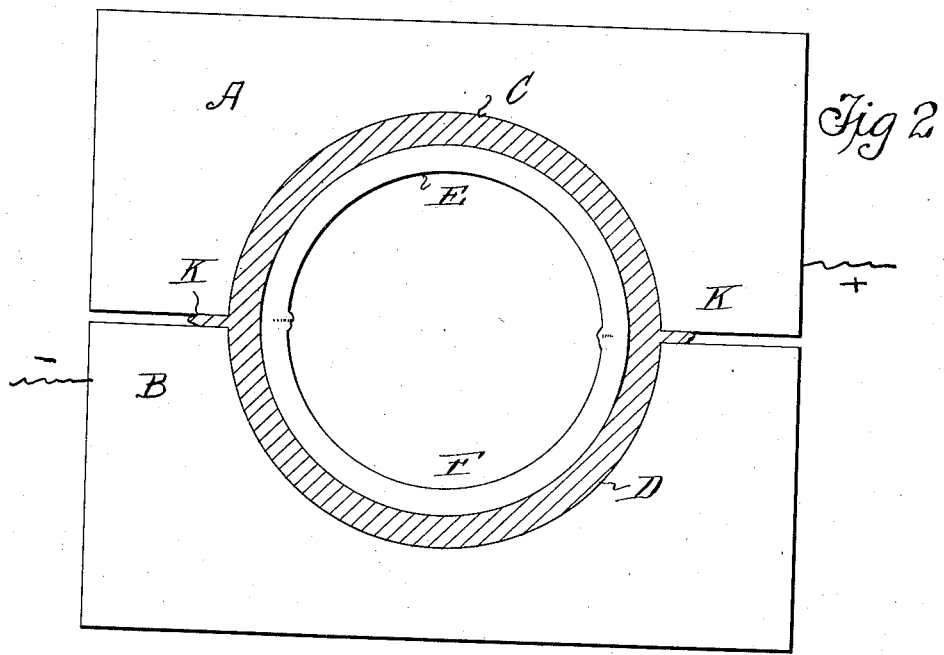
Fig. 2
Inventors
Thomas E. Murray Jr.
Joseph B. Murray
By their Attorney

UNITED STATES PATENT OFFICE.

THOMAS E. MURRAY, JR., AND JOSEPH B. MURRAY, OF BROOKLYN, NEW YORK.

METHOD OF ELECTRICAL WELDING.

1,316,384.   Specification of Letters Patent.   Patented Sept. 16, 1919.

Application filed May 21, 1919. Serial No. 298,747.

*To all whom it may concern:*

Be it known that we, THOMAS E. MURRAY, Jr., and JOSEPH B. MURRAY, citizens of the United States, residing at Brooklyn, in the county of Kings and State of New York, have invented a certain new and useful Improvement in Methods of Electrical Welding, of which the following is a specification.

The invention is a method of completing a metal inner tube and of completing a metal outer inclosing tube, and of uniting together the opposite surfaces of said completed tubes, all by a single electrical welding operation.

In the accompanying drawings—

Figure 1 is an end view of the welding electrodes, the sections of the inner tube and the sections of the outer inclosing tube, the outer tube sections being shown in cross section and the parts being represented in position before welding. Fig. 2 is a similar view, showing the parts after welding. Fig. 3 shows a modification in which the take-ups are on the inner tube.

Similar letters of reference indicate like parts.

A and B are the welding electrodes, movable with respect to one another by any suitable means, not shown, whereby pressure is exerted upon the joint during the welding operation.

The outer inclosing tube is formed in two longitudinal half sections C, D, preferably produced by striking up the metal, which are respectively seated in correspondingly formed longitudinal recesses in said electrodes.

The inner tube is formed in two longitudinal sections E, F, which are respectively seated in the sections C, D of the outer tube. The sections C, D may be provided with take-ups G which extend into the space H between the electrodes A, B, as shown, and the sections E, F of the inner tube may be without take-ups, as shown in full lines in Fig. 1, or both pairs of sections may be provided with take-ups, as shown in dotted lines in Fig. 1 at I, or there may be take-ups J on sections E, F of the inner tube and no take-ups on the sections C, D of the outer tube, as shown in Fig. 3.

When the welding current is established and the electrodes are pressed together, if the take-ups be as shown in full lines in Fig. 1, then the take-ups G will be first fused and part of the fused metal extruded under pressure will run between the sections E, F—another part being extruded between the electrodes to form the fins K. When the edges of sections E, F come into contact with the metal so introduced between them, then a part of the welding current will pass between said edges, highly heating the same and the interposed metal, and so there forming the welded joint.

If the take-ups be as shown at I, dotted lines, Fig. 1, then contact of all the take-ups G, I will occur at the same time, and all will be fused and extruded from the joint simultaneously.

If the take-ups be as shown in Fig. 3, then the take-ups J on the sections E, F of the inner tube will first be fused, and the said fused metal extruded under the pressure will run between the sections C, D and continue between the electrodes, forming again the fins. When the edges of sections C, D come into contact with the metal so introduced between them, then a part of the current will pass between said edges, highly heating the same and the interposed metal, and so there forming the welded joint.

If, for any reason, it is desired that the extruded metal of the outer tube should chiefly enter into the joint between the sections E, F of the inner tube, the take-up arrangement shown in full lines in Fig. 1 is preferable. If, on the contrary, the extruded metal of the inner tube is desired chiefly in the joint, then the take-up arrangement shown in Fig. 3 is preferable. If it is desired that each pair of sections C, D and E, F should be united by its own metal, then the dotted line arrangement of Fig. 1 may be used. In every case, however, the two completed tubes are welded together both by the extruded metal bridging across the joints like a rivet between their registering edges and, in addition, a portion of said metal may by the pressure employed be forced into the peripheral joint, so that the welded area between the opposite surfaces of the two tubes is thus increased. When the take-ups are upon the members of one pair of sections, obviously the welding of the two pairs will occur successively.

We claim:

1. The method of completing a metal inner tube and of completing a metal outer tube inclosing the same and of uniting the opposite peripheral surfaces of said tubes at a single electrical welding operation, which consists in disposing in welding electrodes two longitudinal sections of said outer tube, and seating in said sections two correspondingly shaped sections of said inner tube, the longitudinal opposing edges of the members of each pair of sections being in registry, establishing the welding current and pressing said electrodes together to cause the members of each pair of said sections to become united to each other and to the members of the other pair.

2. The method of completing a metal inner tube and of completing a metal outer tube inclosing the same and of uniting the opposite peripheral surfaces of said tubes at a single electrical welding operation, which consists in disposing in welding electrodes two longitudinal sections of said outer tube, and seating in said sections two correspondingly shaped sections of said inner tube, the longitudinal opposing edges of the members of each pair of sections being in registry, establishing the welding current and pressing said electrodes together to cause the members of each pair of said sections in succession to become united to one another and to cause the members of one pair to become united to the members of the other pair.

In testimony whereof we have affixed our signatures in presence of two witnesses.

THOMAS E. MURRAY, JR.
JOSEPH B. MURRAY.

Witnesses:
GERTRUDE T. PORTER,
MAY T. MCGARRY.